(12) United States Patent
Bullock et al.

(10) Patent No.: US 7,263,280 B2
(45) Date of Patent: Aug. 28, 2007

(54) METHOD AND/OR APPARATUS FOR RETROACTIVE RECORDING A CURRENTLY TIME-SHIFTED PROGRAM

(75) Inventors: Neil R. B. Bullock, San Jose, CA (US); Paul R. Swan, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 1119 days.

(21) Appl. No.: 10/166,868

(22) Filed: Jun. 10, 2002

(65) Prior Publication Data

US 2003/0228140 A1 Dec. 11, 2003

(51) Int. Cl.
*H04N 5/91* (2006.01)
*G11B 27/02* (2006.01)

(52) U.S. Cl. .......................... 386/124; 386/46; 386/52; 386/83; 360/5; 360/13

(58) Field of Classification Search .................... 386/1, 386/4, 18, 46, 52–55, 60, 62, 63, 83, 125–126, 386/45, 95; 360/5, 7, 13; 369/1, 6, 7, 21, 369/84, 85; 345/507–515; 707/200–205; 710/310; 714/21; 711/103, 110
See application file for complete search history.

(56) References Cited

U.S. PATENT DOCUMENTS

| | | | | |
|---|---|---|---|---|
| 5,345,430 A | * | 9/1994 | Moe | 369/7 |
| 6,124,868 A | * | 9/2000 | Asaro et al. | 345/558 |
| 6,201,924 B1 | * | 3/2001 | Crane et al. | 386/52 |
| 6,263,147 B1 | * | 7/2001 | Tognazzini | 386/46 |
| 6,714,720 B1 | * | 3/2004 | Lightstone et al. | 386/46 |
| 2002/0081091 A1 | * | 6/2002 | Tada | 386/46 |

OTHER PUBLICATIONS

"Seek Minimized Recoverable Streaming File System", filed Jun. 10, 2002, U.S. Appl. No. 10/167,172—Author(s)—Swan, Paul.

\* cited by examiner

*Primary Examiner*—Thai Q. Tran
*Assistant Examiner*—Mishawn Dunn
(74) *Attorney, Agent, or Firm*—Christopher P. Maiorana, PC

(57) ABSTRACT

A method for retroactively recording from a circular buffer comprising the steps of (A) determining a starting point in the circular buffer, (B) generating a linear buffer by breaking the circular buffer before the starting point and (C) appending to an ending point of the linear buffer.

20 Claims, 4 Drawing Sheets

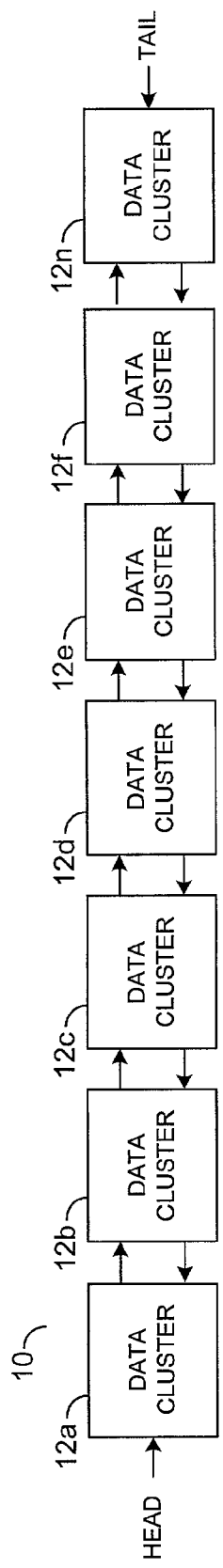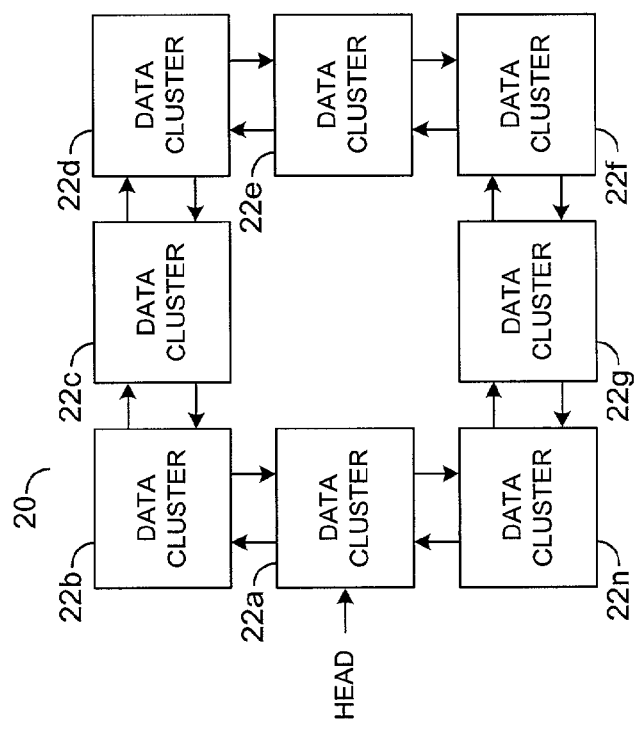

METHOD AND/OR APPARATUS FOR RETROACTIVE RECORDING A CURRENTLY TIME-SHIFTED PROGRAM

CROSS REFERENCE TO RELATED APPLICATIONS

The present application may relate to co-pending application Ser. No. 10/167,172, filed concurrently, which is hereby incorporated by reference in its entirety.

FIELD OF THE INVENTION

The present invention relates to personal video recorders generally and, more particularly, to a method and/or apparatus for implementing retroactive one-time recording a currently time-shifted program in a personal video recorder.

BACKGROUND OF THE INVENTION

Conventional video cassette recorders (VCRs) can implement a one-time record (OTR) feature where a user starts recording current program material at a current location on the tape cassette. Since conventional VCRs do not buffer program material prior to the activation of the recording feature, material prior to activating the recording is not captured. Consequently the first part of a program is often lost, as the user typically decides to activate a one-time recording after a particular program has begun. Recording only a portion of desired program material is unattractive to the user.

Current hard disk drive based digital video recorder (DVR) or personal video recorder (PVR) products tend to emulate the behavior of a VCR. However, unlike a VCR, some portion of the program material prior to the activation of one-time recording has usually been buffered within the DVR.

A DVR typically has two modes of recording operation (i) time shift mode and (ii) background record mode. The time shift mode entails recording a program currently being broadcast for short term manipulation at the convenience of the user. Examples of short term manipulation include pausing the current program (perhaps in response to an external interruption) or instant replay of a sequence in the current program (perhaps a personalized review of important action in a sporting event).

During time shift, the current program is recorded to a time shift buffer. Since the user may rewind (or review) the program at any time, the current program is always being recorded, even when it is being watched live. When the length of the time shift operation exceeds the length of the time shift buffer, the DVR writes the more recent program material over the oldest material in the time shift buffer. Consequently, the short term manipulation is limited to that portion of the current program material stored in the time shift buffer. The short term manipulation creates a lag between the real time broadcast of the program and the point in the program currently being displayed.

In the case of the pause operation, either the operation may be limited to the length of the time shift buffer, such that the material being displayed when the pause operation was started is overwritten with newer program material when the limit of the time shift buffer is reached, or the operation may cause the time shift buffer to be expanded (subject to available storage space), such that a time-shifted program will have the program material wholly contained within the time shift buffer prior to the pause point and the additional program material recorded between the pause point and the live program broadcast.

The background record mode entails the recording of an entire broadcast program for playback at a later time. Recording is initiated at a fixed time, set by the user either directly by channel, time and duration, or indirectly via an electronic program guide (EPG). The user may watch the program being recorded (in real time, or with some time delay) or watch a different program. During background record, the program is recorded to a linear buffer. The length of the program to be recorded dictates the length of the buffer (assuming sufficient space is available) Normally, the buffer is only overwritten if the program is erased and the space is freed for a later recording.

If the user activates a one-time record, the conventional DVR will switch from time shift mode to background record mode. The DVR will then record to the linear background record buffer in place of the circular time shift buffer. The program material contained in the time shift buffer will not be preserved in a conventional DVR.

It would be desirable to implement a personal video recorder that would retroactively record all or part of a live/time-shifted program after the program has begun.

SUMMARY OF THE INVENTION

The present invention concerns a method for retroactively recording from a circular buffer comprising the steps of (A) determining a starting point in the circular buffer, (B) generating a linear buffer by breaking the circular buffer before the starting point and (C) appending to an ending point of the linear buffer.

The objects, features and advantages of the present invention include implementing a recording system that may (i) provide improved flexibility to the end-user, (ii) retroactively record and store information into a linear buffer that was previously stored in a circular buffer and/or (iii) add to the material stored in the linear buffer to create a complete program.

BRIEF DESCRIPTION OF THE DRAWINGS

These and other objects, features and advantages of the present invention will be apparent from the following detailed description and the appended claims and drawings in which:

FIG. 1 illustrates an open-ended chain configuration;
FIG. 2 illustrates a looped chain configuration.

DETAILED DESCRIPTION OF THE PREFERRED EMBODIMENTS

Figure 3:
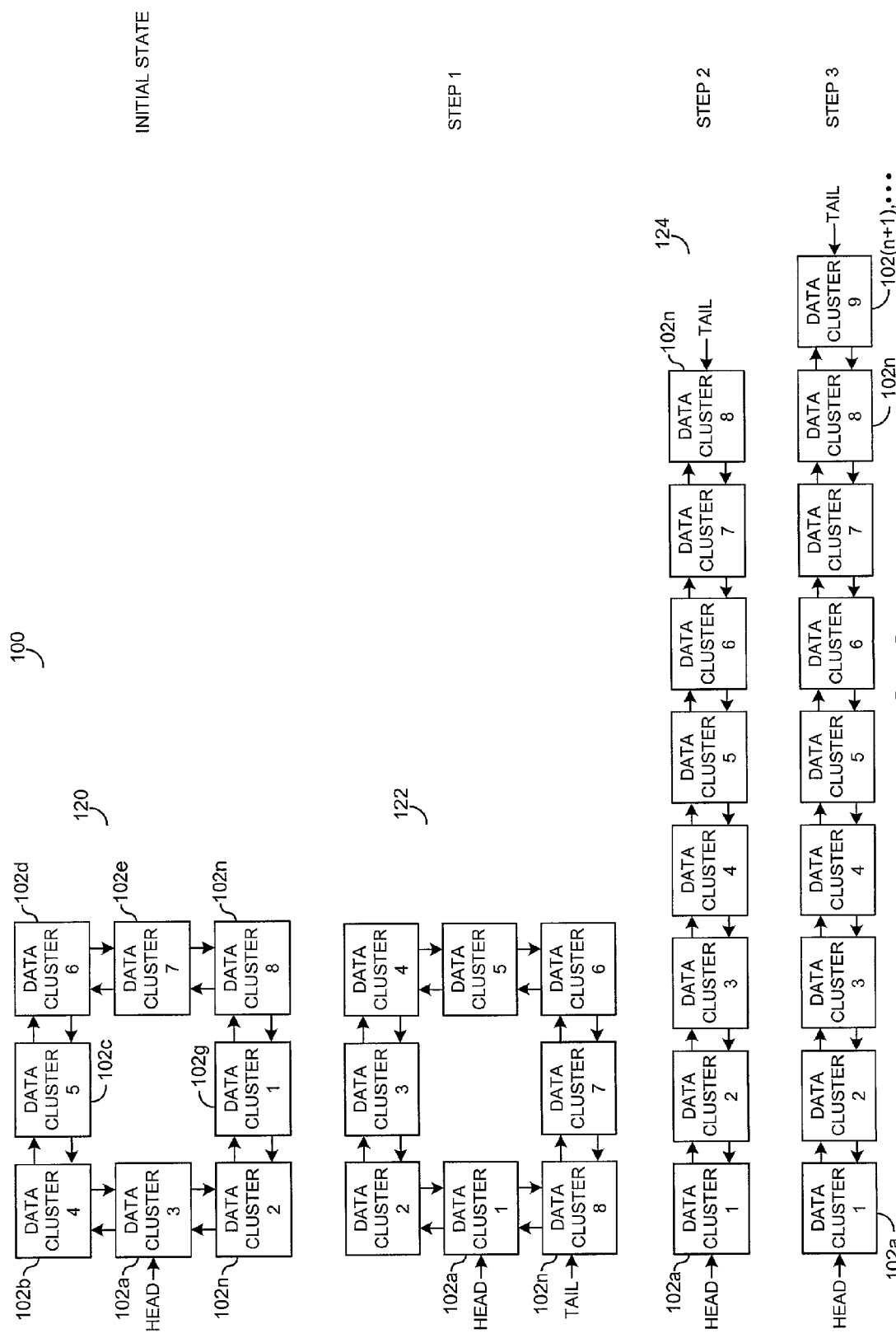
FIG. 3 illustrates a looped to chain conversion.

The present invention provides a method and/or architecture for retroactively recording a currently time-shifted program (e.g., an audio/video recording of a program). The system utilizes the contents of the time-shift buffer to fill in missed portions of the program that have already played out (e.g., the portion of the program that occurred before the live point or point of record). The present invention allows pre-pending (e.g., concatenating at the start) all or part of the program that has already passed (but is stored in the time-shift buffer) to the currently recording program.

A first scenario generally occurs when the user starts watching a live program. During the program, the user may be interrupted and initiate a pause (e.g., pause of live TV event). At some stage in the future the user may want to record the program to watch later. The present invention allows the user to record all of the remainder of the program from the pause point and/or optionally include the whole program from the start.

A second scenario generally occurs when a user starts watching a live program. During the program the user may decide to keep the program to watch again later. The present invention allows the user to record all of the current program from the start.

The present invention may also allow the user to set his own historical start point by either absolute time (e.g., record from 8:00 pm when the current time is now 8:15 pm) or relative time from the current watch point (e.g., record from 15 minutes ago) The implementation of the present invention provides a seamless transition from the time-shifted state to the one-time recorded state without interrupting either the live program or the generated recording. In one example, the present invention may be implemented to always one-time record the time-shifted program. Such perpetual one-time recording may constrain the time-shift feature to that of a one-time-recording (e.g., finite time).

When a user activates a one-time record function, the user would generally prefer that the program be recorded from the start of the broadcast. Program material previously recorded in the time shift buffer is generally concatenated with (e.g., pre-pended to) the program material now being recorded in the background record buffer. Furthermore, the portion of the time shift buffer to be concatenated may be identified. The user may directly enter the amount of time that has elapsed since the start of the broadcast (e.g., a relative time), or the same information may be obtained indirectly from the electronic program guide (EPG). The concatenated program (e.g., the previously recorded data pre-pended to the currently recorded data) may then be presented to the user as a single background recorded program for later presentation. The present invention generally converts (e.g., breaks) the circular time shift buffer into a linear background record buffer. The present invention may also provide a method to identify the start of the broadcast for presentation, if the start of the broadcast does not coincide with the start of the buffer.

The approach of the present invention works well if all the program material from the start of the broadcast is available in the time shift buffer. This may not be the case if the elapsed time since the beginning of the broadcast exceeds the time shift buffer size, or the user changed channel causing the time shift buffer to be flushed. However, this approach represents a significantly improved recording capability when compared to the conventional approach.

Implementation of retroactive one-time recording (ROTR) of the present invention may generate a single recorded program by combining previously buffered data and newly recorded data. To create a single recorded program, the buffered parts of the program in the past and the current broadcast portion of the program need to be spliced together (e.g., concatenated) in some way that does not involve duplication of any part of the program or any discernable break/splice at the point the ROTR was activated. In addition, the start of the program in the past needs to be identified so that what appears to the user/viewer is a single program presented no differently than a recording that was activated on or before the start of the program.

The present invention may implement a bi-directionally linked windowed file system with a file system tailored to the digital video recording. The file system described below solves a number of problems with recording and managing programs in an embedded digital video recording product. While the description concentrates on implementing the ROTR feature only a number of other features (e.g., commercial deletion, holding instead of flushing the buffer during channel changes, etc.) may be implemented in other configurations of the present invention to meet the design criteria of a particular application. The file system described may be configured from conventional data clusters found in other file systems while the management and access scheme may be tailored to digital video recording.

In the file system of the present invention, data clusters are generally bi-directionally linked (instead of being single forward linked as in the case of a conventional file system). This bi-directional linkage allows the clusters to be looped, rotated and converted from a looped chain to an open ended chain safely and quickly (e.g., without corrupting data and at substantially instantaneous timing) when a ROTR request occurs.

Access to the recorded program stored in the data cluster chains is generally defined to within a range specified by two pointers that form a virtual window on the recorded program (instead of being limited by the size of the file as in the case of a conventional file system). Such a window scheme generally allows the application to treat looped (or infinite) recordings no differently than open-ended (or finite) recordings.

Referring to FIG. 1, a diagram 10 illustrating an open-ended chain (linear buffer) configuration of data clusters 12a-12n is shown. In this case, a HEAD (e.g., the beginning of the data) and a TAIL (e.g., the end of the data) index the chain 10 and bound the size of the chain 10 (e.g., the chain 10 is generally finite). Empty clusters (e.g., clusters 12(nH), etc.) may be added to the TAIL of the chain 10 as recording progresses.

Referring to FIG. 2, a diagram 20 illustrating a looped (or infinite) chain (circular buffer) configuration of data clusters 22a-22n is shown. In this case the HEAD generally only indexes the chain and the chain forms a loop. Clusters 22 are generally re-used (recorded over) as the recording loops around the chain 20. In general, no additional empty clusters 22 are added into the chain 20 (e.g., the chain 20 is generally a finite number of data clusters 22 that form an infinite recording loop).

Referring to FIG. 3, a diagram 100 illustrating a looped to open-ended chain conversion process (e.g., method, operation, etc.) in accordance with the present invention is shown. The loop (e.g., a circular buffer) generally comprises a plurality of bi-directionally linked data clusters 102 (e.g., 102a-102n). When in an initial state (e.g., a state 120), the chain 100 of data clusters 102a-102n is in the looped configuration similar to the loop 20. In a first step (e.g., a step 122), the chain 100 is rotated (e.g., the clusters 102a-102n are rotated) such that the application (e.g., user, viewer, etc.) specified (or requested) start position is within the cluster at the HEAD point of the chain (e.g., at the cluster 102a position). A TAIL index is allocated to the chain (e.g., at the cluster 102n position) and the loop in the chain 100 is opened such that the chain of the data clusters 102a-102n is now open-ended (e.g., a linear buffer similar to the buffer 10 is generated).

During the next step (e.g., a step 124), recording generally continues wherein data is recorded into any recovered or unused clusters 102 in the chain 100. During the next step (e.g., step 126), additional empty clusters (e.g., 102(n+1), ...) are added as the recording continues until the end of the program to be recorded. The result is that a normal open-ended (e.g., linear buffer) chain similar to the chain 10 may be generated (or formed). The bi-directional linkage of the clusters 102 generally provide a configuration for the chain (or operation) 100 that may be looped (e.g., the state or step 120), rotated and opened (e.g., the state or step 122), and/or converts to a linear (e.g., open-ended) chain (e.g., the step or state 124).

Figure 4:
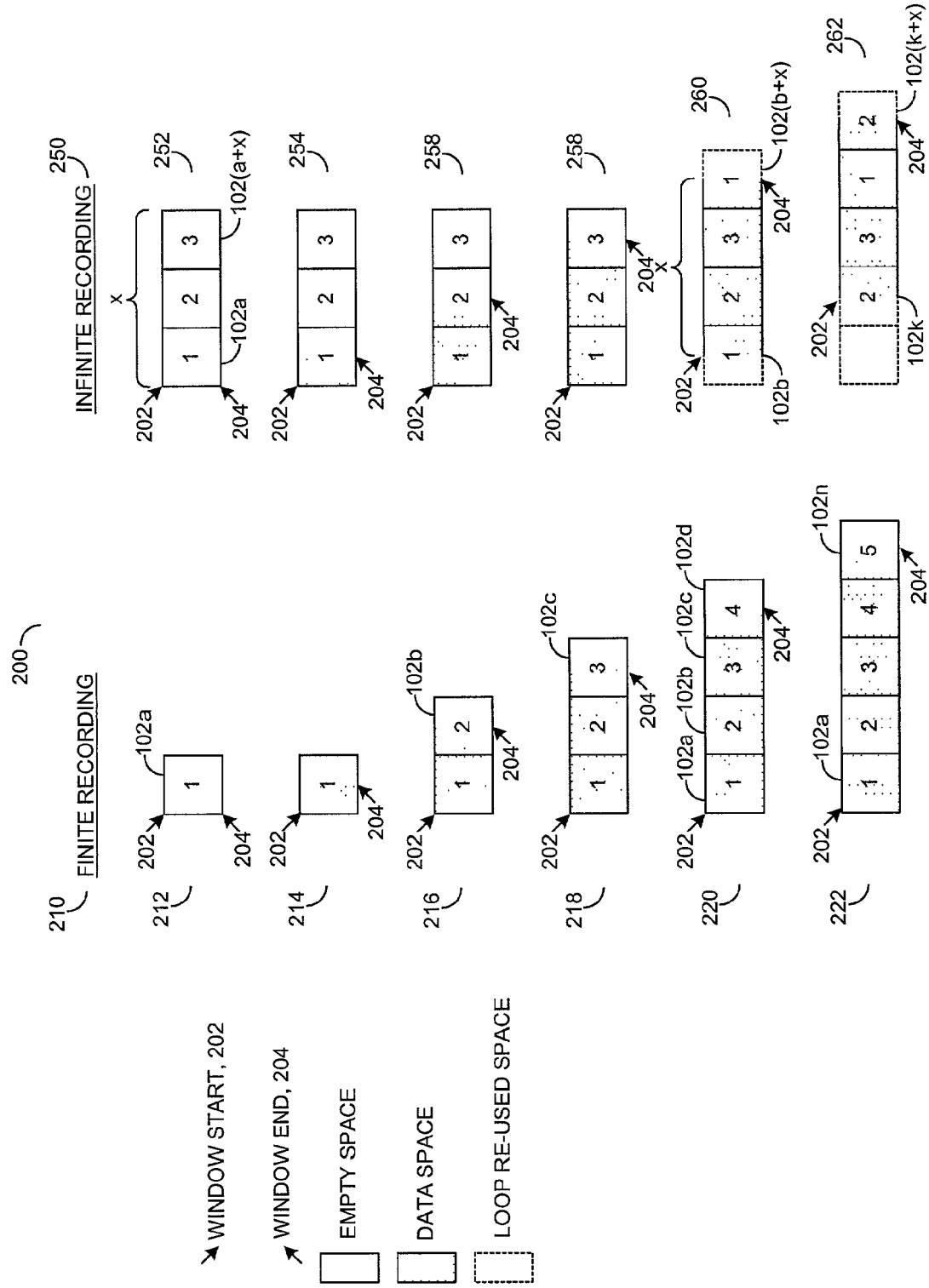
FIG. 4 illustrates an example of a window access scheme.

Referring to FIG. 4, an example of a window access scheme (e.g., process, method, operation, etc.) 200 is shown. The window scheme 200 generally provides two reference pointers for the recorded program, a "Window Start" pointer (e.g., 202) and a "Window End" pointer (e.g., 204). The two pointers 202 and 204 are generally bound (e.g., define, indicate) the valid recording data clusters that the recording application can access. The way the pointers 202 and 204 behave (e.g., reference the respective bi-directionally linked data clusters 102) in response to the recording operation 200 generally varies depending on whether the recorded program is finite (e.g., a mode 210) or infinite (e.g., a mode 250).

The finite recording mode 210 may be implemented similarly to the chain 10 and/or the chain 124/126. The mode (operation, method, process, chain) 210 generally comprises a state (step, block) 212, a state (step, block) 214, a state (step, block) 216, a state (step, block) 218, a state (step, block) 220, and a state (step, block) 222. The pointers 202 and 204 may define a finite recording window (e.g., a window that is bound by the data clusters 102a-102n configured as a linear, open-ended chain).

During an initial state (e.g., the state 212), the start pointer 202 and the end pointer 204 may both be positioned (e.g., adjusted, point to) the beginning of an initial data cluster (e.g., the data cluster 102a). As data space is used (e.g., as recording is performed) the end pointer 204 may move (be re-positioned) in response to the program recording (e.g., the state or block 214). During the states (or steps) 216-222 the window end pointer 204 generally moves (progresses through) the bi-directionally linked data clusters 102b-102n, respectively.

The window start pointer 202 generally remains (continues to be positioned) at the beginning of the cluster 102a. The mode 210 may generate (form) a linear, open-ended chain of clusters 102a-102n as buffer similar to the chain 10 and/or the chain 124/126 where the pointer 202 indicates the start of the linear buffer.

During the infinite recording mode 250, the process (operation, method) 200 generally forms (or generates) a time-shifting window of recorded data that may be configured to operate similar to a loop (or circular buffer) such as the loop 20 and/or 120. The mode 250 generally comprises a state (step, block) 252, a state (step, block) 254, a state (step, block) 256, a state (step, block) 258, a state (step, block) 260, and a state (step, block) 262. The pointers 202 and 204 may define an infinite recording window (e.g., a time-shifted window that is bounded to a predetermined recording time).

During an initial state (e.g., the state 252), the start pointer 202 and the end pointer 204 may be positioned (e.g., point to) the beginning of an initial data cluster (e.g., the data cluster 102a). The mode 250 may define a predetermined recording time that corresponds to a number (e.g., x) data clusters. The mode 250 generally implements a contiguous stream of bi-directionally linked data clusters 102 as a window that is x clusters 102 in length. During the state 252, the clusters 102a-102(a+x) are generally empty and/or open for re-recording.

As recording is performed (e.g., data space is used) the end pointer 204 may move (e.g., be re-positioned) in response to the program recording (e.g., the state or block 254). Recording may continue into the window defined by the data clusters 102a-102(a+x) and the end pointer 204 may be re-positioned, respectively. The start pointer 202 generally remains at the beginning of the cluster 102a (e.g., the states 256-258). When program data that corresponds to the window length x has been recorded, the outer boundary of the window defined by the mode 250 is generally met and the mode 250 may transition to the state 260.

During the state 260, recording generally continues. The window start pointer 202 generally moves (e.g., advances, is repositioned) to the next contiguous data cluster (e.g., the data cluster 102b). Similarly, the window end pointer 204 generally advances to the cluster 102(b+x) (e.g., the data cluster that is x clusters from the data cluster 102b). The mode 250 generally continues to the state 262.

During the state 262, recording generally continues. The start pointer 202 generally moves (e.g., is time-shifted) to the respective data cluster (e.g., 102k). Similarly, the end pointer 204 generally moves to the respective data cluster (e.g., 102(k+x)) such that the window defined by the mode 250 remains at the length x. During the state 262, the operation 250 may record over previously recorded data (e.g., the data clusters 102k-102(k+x) may comprise one or more of the clusters 102a-102(k+x−1)). The operation 250 may operate as an infinite recording loop of length x as defined by the shifting window between the pointers 202 and 204 (e.g., a time-shifted circular buffer).

In another example, the operation 200 may be configured to implement the operation 210 and the operation 250 simultaneously. The mode 210 may be implemented as a temporary linear buffer and the mode 250 may be implemented as a circular buffer. Program data may be stored simultaneously in the linear buffer 210 and the circular buffer 250.

Figure 5:
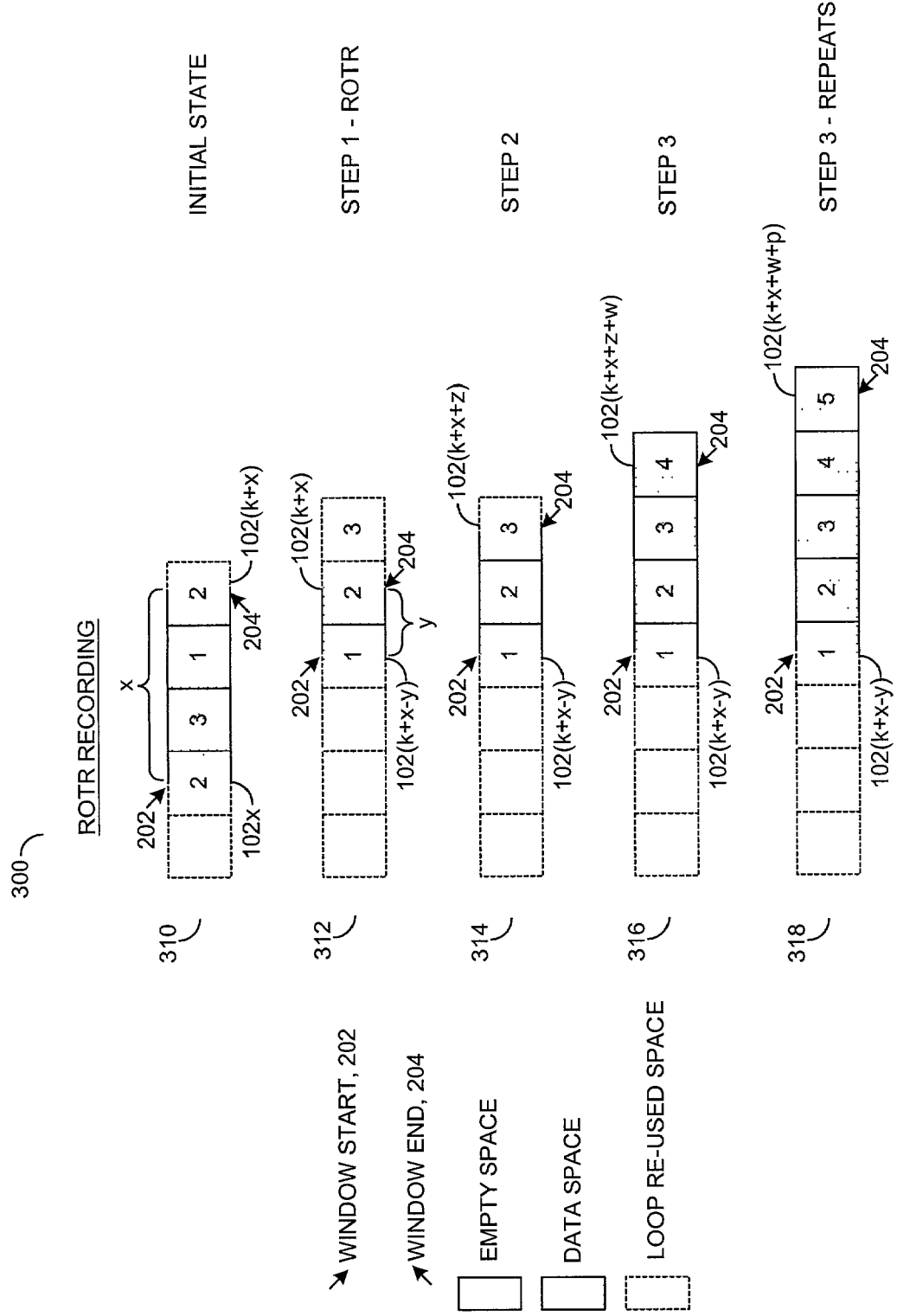
FIG. 5 illustrates an example of retroactive recording.

Referring to FIG. 5, an example of a retroactive recording (ROTR) operation (e.g., method, process, procedure, etc.) 300 in accordance with a preferred embodiment of the present invention is shown. For the ROTR operation 300, the infinite (circular buffer) program recording is generally converted to a finite (and/or pre-pended) program recording so that all of the existing recording can be preserved and the future recording can be added. The operation 300 generally comprises a step (or state) 310, a step (or state) 312, a step (or state) 314, a step (or state) 316, and a step (or state) 318.

An initial state (e.g., the state 310) occurs when there is an infinite (e.g., a shifting window configured as a circular buffer or loop) recording in progress bounded by the window pointers 202 and 204. The initial state 310 may be implemented similarly by the time mode 250. The pointer 202 may indicate a start of a circular buffer at the cluster 102k and the pointer 204 may indicate the end of a circular buffer (having a length of x clusters 102) at the cluster 102(k+x).

During a first step (e.g., the step or state 312), the window start pointer 202 may be adjusted (shifted, set) based on (in response to) the applications (user, viewer) request to include all or part of the recording already contained in the on-going infinite recording 310. The user generally specifies the portion (e.g., a length y) of previously recorded program material (data) to be included (i) by an absolute designation (e.g., a previous time), (ii) by a relative time designation (e.g., the previous length y of data clusters 102), or (iii) by a designation that corresponds to a program guide reference (e.g., a position determined from an EPG that generally relates to a program start time). The previously recorded material generally corresponds to the member y of the clusters 102. The window start pointer 202 is generally shifted (adjusted, rotated, set, re-positioned) back to a data cluster 102 that corresponds to the user selected (determined) recording beginning time (e.g., the cluster 102($k+x-y$)). The cluster 102($k+x-y$) generally corresponds to a time before the time at which the user decides to record the current program. The step 312 may be implemented to break the circular buffer (loop) 310 (e.g., the loop formed by the clusters 102$k$-102($k+x$)) and generate (form) a linear buffer having a starting point indicated by the pointer 202 (e.g., a starting point at the cluster 102($k+x-y$)). Discarded portions of the infinite recording 310 are generally rotated (positioned) to beyond the window end point 204 (e.g., beyond data cluster 102($k+x$)) for future re-use (re-recording).

During the next step (e.g., the step or state 314), recording continues using up any recovered or unused space originally allocated to the infinite recording 310. The start pointer 202 generally remains at the cluster 102($k+x-y$). The end pointer 204 generally advances (e.g., to the) cluster 102($k+x+z$).

During the next steps (e.g., the steps 316-318), more empty space (e.g., clusters 102($k+z+w$) and 102($k+z+w+p$), respectively) is added as the recording continues until the end of the program to be recorded. The start pointer 202 generally remains at the cluster 102($k+x-y$).

Since no part of the program recorded during the operation (method) 300 is physically moved or spliced, the operation 300 may be performed while the program is still being recorded with no interruption to the recording. The resulting recording may appear to a user/viewer as a normal (or conventional) finite recorded program for future use (e.g., viewing/listening).

The function performed by the diagrams of FIGS. 3-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the present invention has been described in connection with one or more digital audio/video recording applications, the method and/or apparatus taught by the present invention may be implemented in any appropriate application to meet the design criteria of the particular application.

While the invention has been particularly shown and described with reference to the preferred embodiments thereof, it will be understood by those skilled in the art that various changes in form and details may be made without departing from the spirit and scope of the invention.

The invention claimed is:

1. A method for retroactively converting the storage of a plurality of data clusters from a circular buffer to a linear buffer, comprising the steps of:
   (A) determining a starting point in said circular buffer, wherein said circular buffer (i) comprises a plurality of linked data clusters and (ii) is accessed by moving directly from a first data cluster to a second data cluster in response to an address of said second data cluster being stored within said first data cluster;
   (B) breaking said circular buffer before said starting point to convert said circular buffer to said linear buffer; and
   (C) appending to an ending point of said linear buffer, wherein said method performs said conversion without duplicating any of said linked data clusters.

2. The method according to claim 1, wherein said method is used for storing an audio/video program.

3. The method according to claim 1, wherein said data clusters in said linear buffer are marked to (i) not be overwritten and (ii) be available for future use.

4. The method according to claim 1, wherein (i) said circular buffer comprises a time-shifted circular buffer and (ii) said data clusters in said circular buffer are marked to be overwritten.

5. The method according to claim 1, wherein step (B) breaks said circular buffer without duplicating data stored in said circular buffer.

6. The method according to claim 1, wherein said starting point comprises a head and said ending point comprises a tail.

7. The method according to claim 6, wherein step (A) further comprises rotating said circular buffer to said head.

8. The method according to claim 1, wherein said data clusters comprise a plurality of bi-directionally linked data clusters.

9. The method according to claim 1, wherein data stored in said circular buffer is simultaneously accessible as a temporary linear buffer.

10. The method according to claim 1, wherein said step (A) is initiated in response to a user input defining a relative time.

11. The method according to claim 1, wherein said step (A) is initiated in response to a user input defining an absolute time.

12. The method according to claim 1, wherein said step (A) is initiated in response to a user input defining a program guide time.

13. A method for recording, comprising the steps of:
   (A) recording to a plurality of data clusters configured as a circular buffer, wherein said data clusters (i) comprise linked data clusters arid (ii) are accessed by moving directly from one of said data clusters to another of said data cluster in response to an address of said another of data cluster being stored within said one of said data clusters;
   (B) initiating a retroactive conversion of said data clusters to a linear buffer, wherein said conversion begins at a starting point representing a time within said data clusters;
   (C) breaking said data clusters at said starting point to mark a beginning of said linear buffer; and
   (D) marking said data clusters in said linear buffer to be saved for future use, wherein said method performs said conversion without duplicating any of said linked data clusters.

14. A computer readable medium encoded with a computer program containing one or more sets of executable instructions for performing the steps of claim 1.

15. The method according to claim 13, further comprising the step of:
   appending additional material to an end of said data clusters configured as said linear buffer.

16. The method according to claim 13, wherein said data clusters comprise a plurality of bi-directionally linked data clusters.

17. The method according to claim 13, wherein step (B) further comprises rotating said data clusters to said starting point.

18. An apparatus comprising:
- a plurality of bi-directionally linked data clusters wherein said plurality of data clusters are consecutively accessed (i) without referencing a central file table and (ii) by moving directly from a first data cluster to a second data cluster in response to an address of said second data cluster being stored within said first data cluster;
- a first pointer configured to indicate a start of a window comprising a predetermined number of said data clusters; and
- a second pointer configured to indicate an end of said window, wherein data stored in said data clusters is converted between a circular buffer configuration and a linear buffer configuration in response to a user input, wherein the data is converted without duplicating any of said linked data clusters.

19. The apparatus according to claim 18, wherein (i) during a first mode of operation of said apparatus a first of said plurality of data clusters is bi-directionally linked to a last of said data clusters such that said data clusters form said circular buffer and (ii) during a second mode of operation said first pointer is positioned to indicate a start of said linear buffer.

20. The apparatus according to claim 19, wherein during said second mode of operation said first pointer is rotated to one of said plurality of data clusters in response to a user selected time.

* * * * *